United States Patent
Kaida

(10) Patent No.: US 8,229,487 B2
(45) Date of Patent: Jul. 24, 2012

(54) PTT SERVER, GATE APPARATUS, COMMUNICATION SYSTEM, PROGRAM AND COMMUNICATION METHOD

(75) Inventor: Sou Kaida, Tokyo (JP)

(73) Assignee: NEC Corporation, Tokyo (JP)

( * ) Notice: Subject to any disclaimer, the term of this patent is extended or adjusted under 35 U.S.C. 154(b) by 1061 days.

(21) Appl. No.: 11/994,948

(22) PCT Filed: Aug. 1, 2006

(86) PCT No.: PCT/JP2006/315224
§ 371 (c)(1),
(2), (4) Date: Jan. 7, 2008

(87) PCT Pub. No.: WO2007/015488
PCT Pub. Date: Feb. 8, 2007

(65) Prior Publication Data
US 2009/0131092 A1 May 21, 2009

(30) Foreign Application Priority Data
Aug. 2, 2005 (JP) .................................. 2005-224172

(51) Int. Cl.
*H04B 7/00* (2006.01)
(52) U.S. Cl. ........ 455/518; 455/519; 455/416; 455/418; 455/41.2; 455/3.05; 370/260; 370/277; 370/296; 379/202.01
(58) Field of Classification Search .................. 455/518, 455/517, 519, 416, 418, 422.1, 41.2, 3.05, 455/90.2; 370/260, 276, 277, 296, 352, 395.1; 379/202.01, 88.19
See application file for complete search history.

(56) References Cited

U.S. PATENT DOCUMENTS

| 7,801,953 | B1 * | 9/2010 | Denman et al. | ............... 709/204 |
|---|---|---|---|---|
| 2002/0077136 | A1 * | 6/2002 | Maggenti et al. | ............. 455/518 |
| 2006/0035630 | A1 * | 2/2006 | Morishima et al. | ........... 455/416 |
| 2006/0116150 | A1 * | 6/2006 | Bhutiani | ....................... 455/518 |
| 2006/0142036 | A1 * | 6/2006 | Lim | ............................... 455/518 |
| 2006/0193416 | A1 * | 8/2006 | Horio et al. | .................... 375/371 |
| 2006/0276213 | A1 * | 12/2006 | Gottschalk et al. | ........... 455/518 |
| 2009/0176522 | A1 * | 7/2009 | Kowalewski et al. | ......... 455/517 |

FOREIGN PATENT DOCUMENTS

| JP | 2001-36528 | A | 2/2001 |
|---|---|---|---|
| JP | 2001-298545 | A | 10/2001 |
| JP | 2002-9765 | A | 1/2002 |
| JP | 2002-536928 | A | 10/2002 |
| JP | 2004-187108 | A | 7/2004 |
| WO | WO 00/47005 | | 8/2000 |

OTHER PUBLICATIONS

International Search Report, PCT/ISA/210, Apr. 2005.

* cited by examiner

*Primary Examiner* — Shaima Q Aminzay
(74) *Attorney, Agent, or Firm* — Sughrue Mion, PLLC

(57) ABSTRACT

A PoC communication system suitable for a broadcast use or the like is provided. In a communication system including a PoC server 30 and terminals 10 and terminals MS1 to MSn connectable to the PoC server 30, the PoC server 30 classifies the terminals into a terminal of first kind 10 having authority to assign a transmission right and terminals of second kind MS1 to MSn not having the authority to assign the transmission right and registers and manages each terminal joining in a group. The PoC server 30 assigns the transmission right to another terminal belonging to the group on the basis of designation from the terminal of first kind 10, and transmission data from the terminal assigned the transmission right is broadcast at a time via a packet communication network.

21 Claims, 5 Drawing Sheets

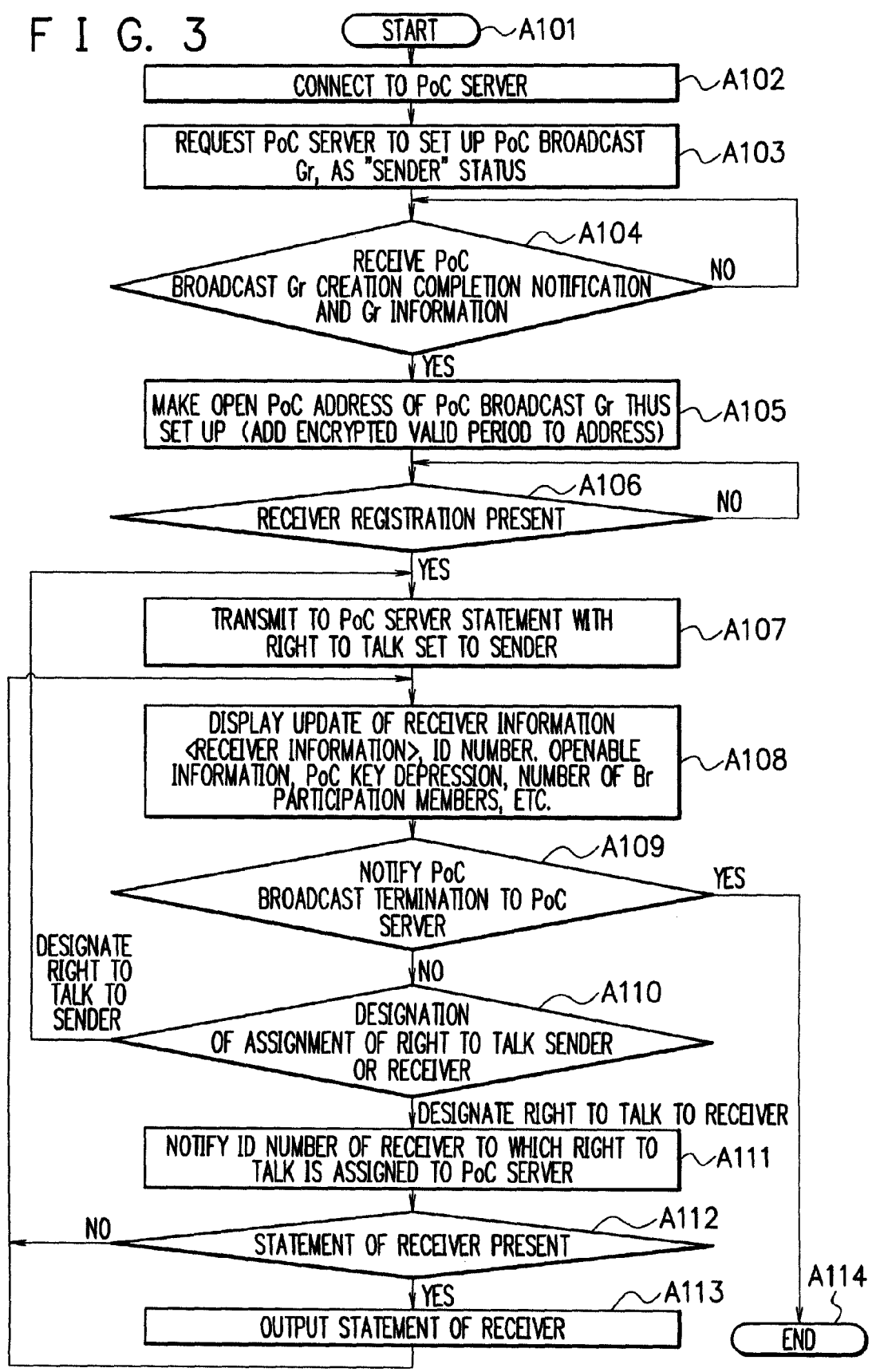

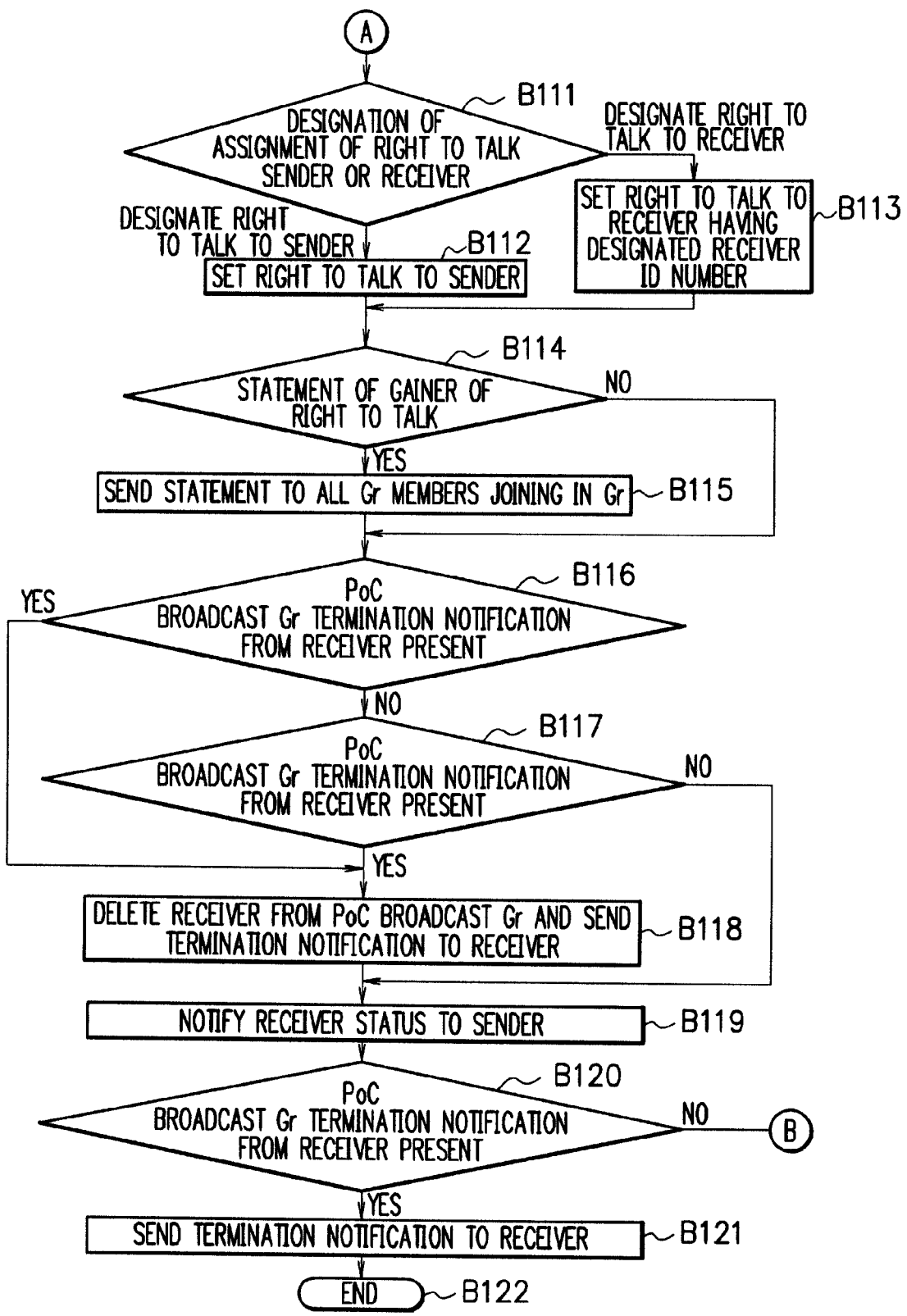

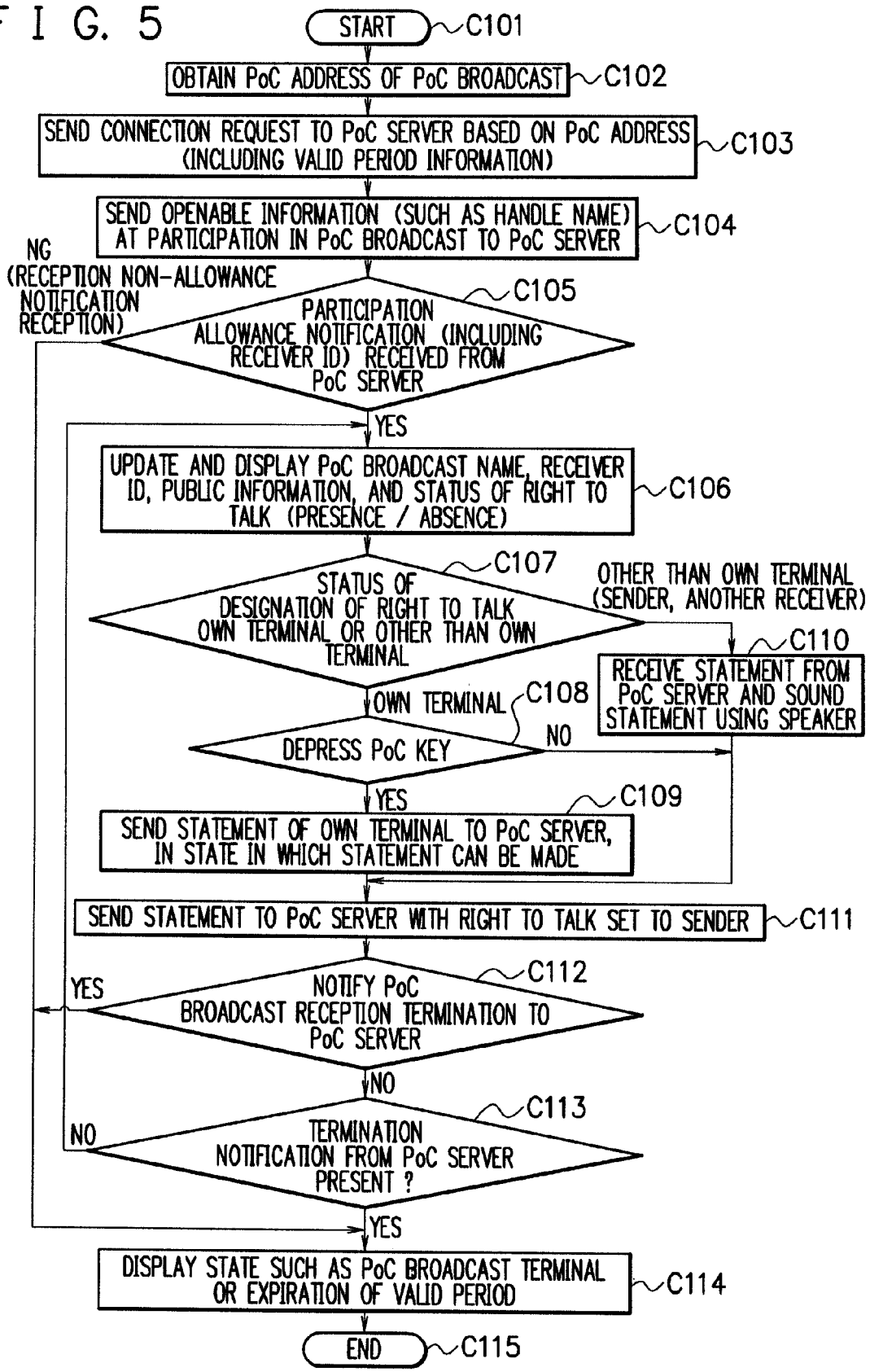

PTT SERVER, GATE APPARATUS, COMMUNICATION SYSTEM, PROGRAM AND COMMUNICATION METHOD

BACKGROUND

1. Technical Field

The present invention pertains to a Push-to-Talk (PTT hereinbelow) server, a gate apparatus, a communication system, a program, and a communication method employing a cellular phone including a PTT function to implement a one-to-many communication between terminals.

2. Related Art

Recently, a Push-to-Talk over Cellular (PoC hereinbelow) service in which the PTT function is installed in cellular phones or cellulars to implement one-to-many calls is about to be broadly used. As a feature of this PoC service, distinct from the call service of line switching type, there is a service in which one-to-many calls can be carried out. However, due to the restriction on the bandwidth or the like, two or more persons cannot simultaneously speak; a half-duplex call service is being considered in which, like in a call service of a transceiver, after a first speaker finishes a talk, another speaker obtains the right to speak and then starts talking.

The PoC service is implemented by a PoC server including management of PoC groups (group management function), registration of members, recognition of information of attendance or non-attendance such as "absence" or "presence" of a member (presence function), and assignment of the right to talk or floor (floor control; PoC function). For the call control in the PoC server, there is employed the session initiation Protocol (SIP) as in the IP telephone and the like. After establishing a session with a communicating party, Voice over IP (VoIP hereinbelow) communication of sound and voice is conducted according to an IP address assigned to a terminal in the configuration.

In the configuration of the present PoC communication, the respective members stand on an equal footing with each other; in a released state of the floor (no one is speaking), a user pushes a call start button of a terminal to transmit a floor acquisition notification to the PoC server to resultantly get the floor. In a case where many and unspecified persons join in a PoC group, any one thereof can obtain the floor under the above condition to make a statement. In addition, the participants in the PoC group are able to equally attain information about the members participating therein in the system.

Patent article 1 discloses a broadcast system adopting the PPT technique. Also in the document, the respective members are treated as equal; a server determines one of the wireless telephones in a button depression state to which a message allocation right is given and then transmits audio data from the determined wireless telephone to the other wireless telephones in the configuration.

Additionally, patent document 2 discloses a multipoint conference system which does not employ the PoC technique and in which the respective terminals are not treated as equal, the system including a terminal only for reception and a terminal for transmission and reception.

Patent document 1: Published Japanese Translations No. 2002-536928 of PCT International Publication Patent document 2: Japanese Patent Laid-Open Publication No. 2004-187108

SUMMARY

Accordingly to an aspect of the present application, a Push-to-Talk server (PTT server) is provided for providing a half-duplex data transfer service wherein transmission data from a terminal which is connected to a packet communication network and which is assigned with a transmission right is broadcast at a time via the packet communication network to terminals of a group to which the terminal belongs.

The PTT server includes a unit which classifies terminals joining in a group into terminals of first kind having authority to assign the transmission right and terminals of second kind not having authority to assign the transmission right and thereby managing the respective terminals joining in the group; and a unit which assigns the transmission right to another terminal belonging to the group according to designation from the terminal of first kind.

Only a terminal having issued an open request of the group is regarded as the terminal of first kind and authority to assign the transmission right is assigned to the terminal.

Furthermore, only releasable information sent from the terminal of second kind is notified to the other terminals.

The PTT server may also include a unit which determines whether or not each of the terminals is allowed to join in the group on the basis of a valid period given to the terminal.

A gate apparatus may also be provided which includes a unit which automatically transmits an address set to each group inherent to each area to a terminal comprising a contactless IC. The gate apparatus makes the terminal issue a request that the PTT server join in a group corresponding to the area.

Accordingly to another aspect of the present application, a communication system is provided which includes a PTT server connected to a packet communication network and a group of terminals connectable to the PTT server for providing a half-duplex data transfer service. The transmission data from a terminal to which a transmission right is assigned by the PTT server is broadcast at a time via the packet communication network to terminals of a group to which the terminal belongs.

The PTT server includes a unit which classifies terminals joining in an arbitrary group into terminals of first kind having authority to assign the transmission right and terminals of second kind not having authority to assign the transmission right and thereby managing the respective terminals joining in the group; and a unit which assigns the transmission right to another terminal belonging to the group according to designation from the terminal of first kind.

Only a terminal having issued an open request of the group is designated as the terminal of first kind.

Furthermore, the PTT server notifies only releasable information sent from the terminal of second kind to the other terminals and the terminal of first kind makes a list of the releasable information open.

Additionally, an address set to each group is made to be open with valid period information added thereto, and the PTT server may include a unit which determines whether or not each of the terminals is allowed to join in the group on the basis of valid period information transmitted from the terminal.

A gate apparatus may also be provided which includes a unit which automatically transmits an address set to each group inherent to each area to a terminal comprising a contactless IC is further disposed for each predetermined area, the gate apparatus making the terminal issue a request to the PTT server to join in a group corresponding to the area.

Accordingly to another aspect of the present application, a computer-readable medium is provided which stores a program to be executed by a computer constituting a PTT server for providing a half-duplex data transfer service wherein transmission data from a terminal which is connected to a packet communication network and which is assigned with a transmission right is broadcast at a time via the packet communication network to terminals of a group to which the terminal belongs. The program causes the PTT server to perform processing for classifying terminals joining in a group into terminals of first kind having authority to assign the transmission right and terminals of second kind not having authority to assign the transmission right and thereby registering and managing the respective terminals joining in the group; and processing for assigning the transmission right to another terminal belonging to the group according to designation from the terminal of first kind.

Only a terminal having issued an open request of the group is registered as the terminal of first kind and terminals joining in the group are registered as terminals of second kind.

The program may also cause the PTT server to perform processing for notifying releasable information sent from the terminal of second kind to the other terminals.

The program may also cause the PTT server to perform processing for determining whether or not each of the terminals is allowed to join in the group on the basis of a valid period given to the terminal.

Accordingly to another aspect of the present application, a communication method is provided which is to be implemented by use of a communication system which includes a PTT server connected to a packet communication network and a group of terminals connectable to the PTT server for providing a half-duplex data transfer service wherein transmission data from a terminal to which a transmission right is assigned by the PTT server is broadcast at a time via the packet communication network to terminals of a group to which the terminal belongs.

The communication method includes classifying, by the PTT server, terminals joining in a group into terminals of first kind having authority to assign the transmission right and terminals of second kind not having authority to assign the transmission right and thereby registering and managing the respective terminals joining in the group; and assigning, by the PTT server, the transmission right to another terminal belonging to the group according to designation from the terminal of first kind.

Only a terminal having issued an open request of the group is registered as the terminal of first kind and terminals joining in the group are registered as terminals of second kind.

Furthermore, the communication method may also include notifying, by the PTT server, releasable information sent from the terminal of second kind to the other terminals; and making by the terminal of first kind a list of the releasable information open.

An address set to each group is made open with valid period information added thereto, and the communication method may also include determining by the PTT server whether or not each of the terminals is allowed to join in the group on the basis of valid period information transmitted from the terminal.

The communication method may also include acquiring by an arbitrary terminal an address set to each group from a web site; and issuing by the terminal a request to join in the group to the PTT server by use of the address.

The communication method may also include acquiring by an arbitrary terminal an address set to each group from a bar code, by use of a bar code disposed in the terminal; and issuing by the terminal a request to join in the group to the PTT server by use of the address.

The communication method may also include acquiring by an arbitrary terminal an address set to each group from a gate apparatus disposed in a predetermined area, by use of a contactless IC disposed in the terminal; and issuing by the terminal a request to join in the group corresponding to the area to the PTT server by use of the address.

BRIEF DESCRIPTION OF THE DRAWINGS

FIG. 3 is a diagram for explaining operation of an information terminal in a broadcast system (PoC broadcast system) in accordance with the first embodiment of the present invention.

FIG. 5 is a diagram for explaining operation of a cellular in a broadcast system (PoC broadcast system) in accordance with the first embodiment of the present invention.

DESCRIPTION OF REFERENCE NUMERALS

Figure 1:
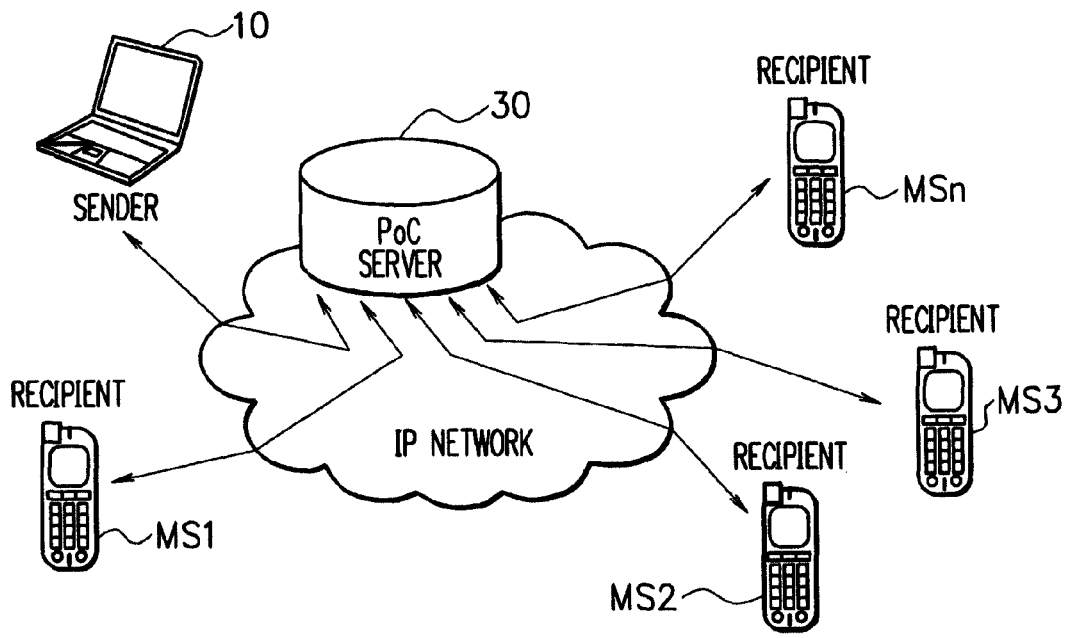
FIG. 1 is a diagram showing a configuration of a broadcast system (PoC broadcast system) in accordance with a first embodiment of the present invention.

10 Information terminal (sender; issuer)
12 Controller
13 Memory
14 Wireless module
15 Console
16 Display
17 Microphone
18 Speaker
19 Contactless IC
20 Camera
30 PoC server
MS1 to MSn Cellular (recipient)

DETAILED DESCRIPTION OF THE EXEMPLARY EMBODIMENTS

Incidentally, in a situation where the PTT or PoC technique is applied to a broadcast system, a conference system, or the like to which an arbitrary terminal may attend, there exists a request that it be avoided for unspecified members to freely make a statement, or that even if the statement is allowed, a chairperson or the like have authority to allow the floor.

In this point, according to the technique of patent document 1, since all wireless telephones may make a statement in the configuration, it is considered that those who are not desirable are to be removed at a stage in which they attempt to join in the group. Also, in the technique of patent document 2, under authority of the terminal of the conference organizer, a state (status) of a terminal having issued a statement request can be changed such that a plurality of terminals become senders (reference is to be made to steps d to k of FIG. 2 and FIG. 3 of the publication). However, with the restriction of the half duplex, it is not possible to allocate the data transmission right to a plurality of terminals.

It is an object of the present invention, which has been devised in consideration of the situation described above, to provide a communication system, an apparatus, a program, and a communication method wherein assignment of a data transmission right is under authority of a predetermined person in a half-duplex data transfer service in which transmission data from a terminal to which a PTT server has given a transmission right via the packet communication network is broadcast to the other terminals.

In accordance with a first aspect of the present invention, there are provided a Push-to-Talk server (PTT server), a communication system (broadcast system/conference system) including the PTT server, and a program to implement the PTT server wherein the PTT server is a PTT server for providing a half-duplex data transfer service wherein data is broadcast, from a terminal to terminals which are connected to a packet communication network and which are in a group to which the terminal belongs, at a time via the packet communication network characterized by including a module for classifying terminals joining in a group into terminals of first kind having authority to assign the transmission right and terminals of second kind not having authority to assign the transmission right and thereby managing the respective terminals joining in the group, and a module for assigning the transmission right to another terminal belonging to the group according to designation from the terminal of first kind.

Also, in accordance with a second aspect of the present invention, there is provided a communication method (broadcast method/conference method) to be implemented by use of a communication system including the Push-to-Talk server (PTT server) and a group of terminals connectable to the PTT server characterized by including a step of classifying, by the PTT server, terminals joining in a group into terminals of first kind having authority to assign the transmission right and terminals of second kind not having authority to assign the transmission right and thereby registering and managing the respective terminals joining in the group, and a step of assigning, by the PTT server, the transmission right to another terminal belonging to the group according to designation from the terminal of first kind.

Also, in accordance with a third aspect of the present invention, there are provided a gate apparatus, a communication system including the gate transmission, and a communication method wherein the gate apparatus is a gate apparatus characterized by including a module for automatically transmitting an address set to each group inherent to each area to a terminal including a contactless IC, the gate apparatus making the terminal issue a request to join in a group corresponding to the area to the PTT server.

In accordance with the present invention, it is possible to distribute data in a mode in which transmission from a terminal of a person having the leadership of the PoC group with the restriction of the half duplex and transmission by interruption from a second terminal designated by the terminal are mixed with each other.

Moreover, in accordance with the gate apparatus of the present invention, it is possible to make the communication system function as an area restricted information system for a particular area.

Subsequently, description will be given in detail of a best mode for carrying out the present invention by referring to drawings. FIG. 1 is a diagram showing a configuration of a broadcast system (PoC broadcast system) according to a first embodiment of the present invention in which the PoC technique is applied to the use of broadcast. Referring to FIG. 1, there is shown a broadcast system in which an information terminal (sender; issuer) 10, cellulars (recipients; receivers) MS1 to MSn, and a PoC server 30 are connected via an IP network to each other.

The information terminal 10 is an information processing apparatus such as a personal computer including an input and output device to allocate a floor and a microphone and speaker module to send and to receive audio data to and from the PoC server 30. Since only the information terminal 10 has authority to allocate the floor to lead the speaking of all members, the terminal will be called an issuer or sender terminal hereinbelow.

Figure 2:
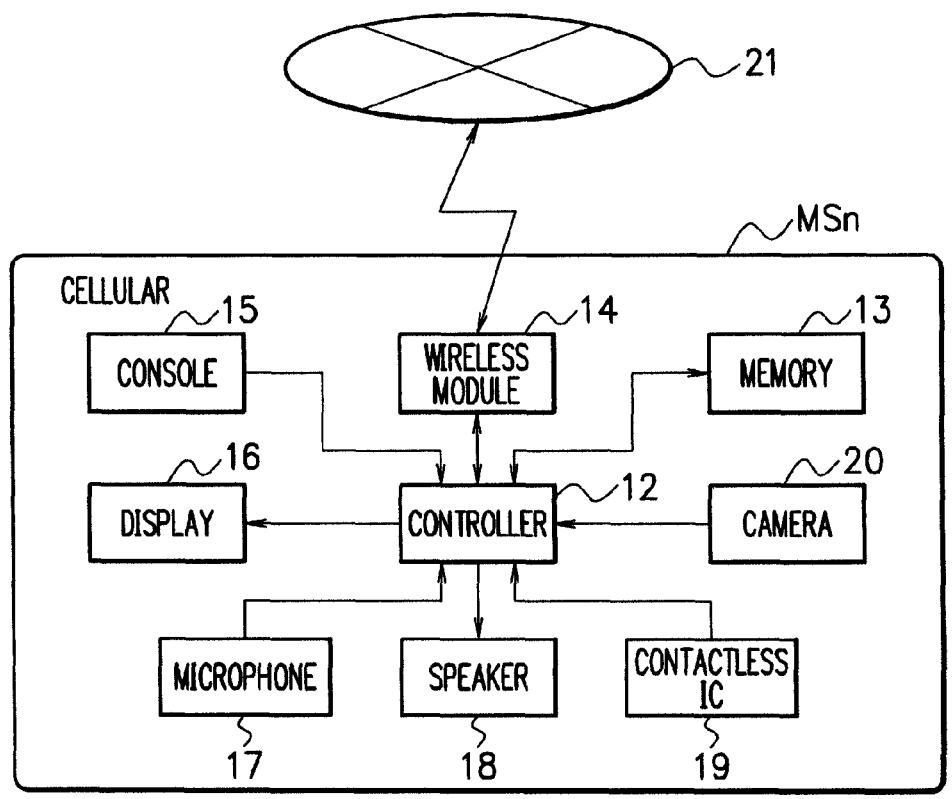
FIG. 2 is a diagram showing a detailed configuration of a cellular employed in a broadcast system (PoC broadcast system) in accordance with the first embodiment of the present invention.

FIG. 2 is a diagram showing a detailed configuration of the cellular MSn. Referring to FIG. 2, the cellular MSn includes a controller 12 to control operation of each module thereof, a memory 13 to keep information therein, a wireless module 14 to wirelessly connect to a communication network, a console 15 to accept various operations, a display 16 to display various information, and a speaker 18 to output sound and voice. The cellulars MS1 to MSn do not have the authority to allocate the floor and hence will be also called receiver terminals hereinbelow.

Furthermore, more desirably, the cellular MSn includes, from a viewpoint of facilitation of PoC address acquisition, either one or both of a contactless IC 19 to receive a PoC address from a gate apparatus installed in a broadcast area, which will be described later, and a camera 20 to read a bar code from a print medium or the like such as a magazine.

The PoC server 30 is an information processor in which a program is installed, the program implementing a group management function to manage a PoC group; a presence function including registration of a member, recognition of attendance and non-attendance information such as "absence" and "presence" of a member, and management in which the members are classified into an issuer (terminal of first kind) having authority to allocate the floor and a receiver (terminal of second kind) not having authority to allocate the floor; and a PoC function to allocate the floor according to designation from the issuer (terminal of first kind). SIP is adopted for call control; after a session is established for a communicating party, VoIP communication is conducted according to an IP address assigned to each cellular in the configuration.

Figure 4A:
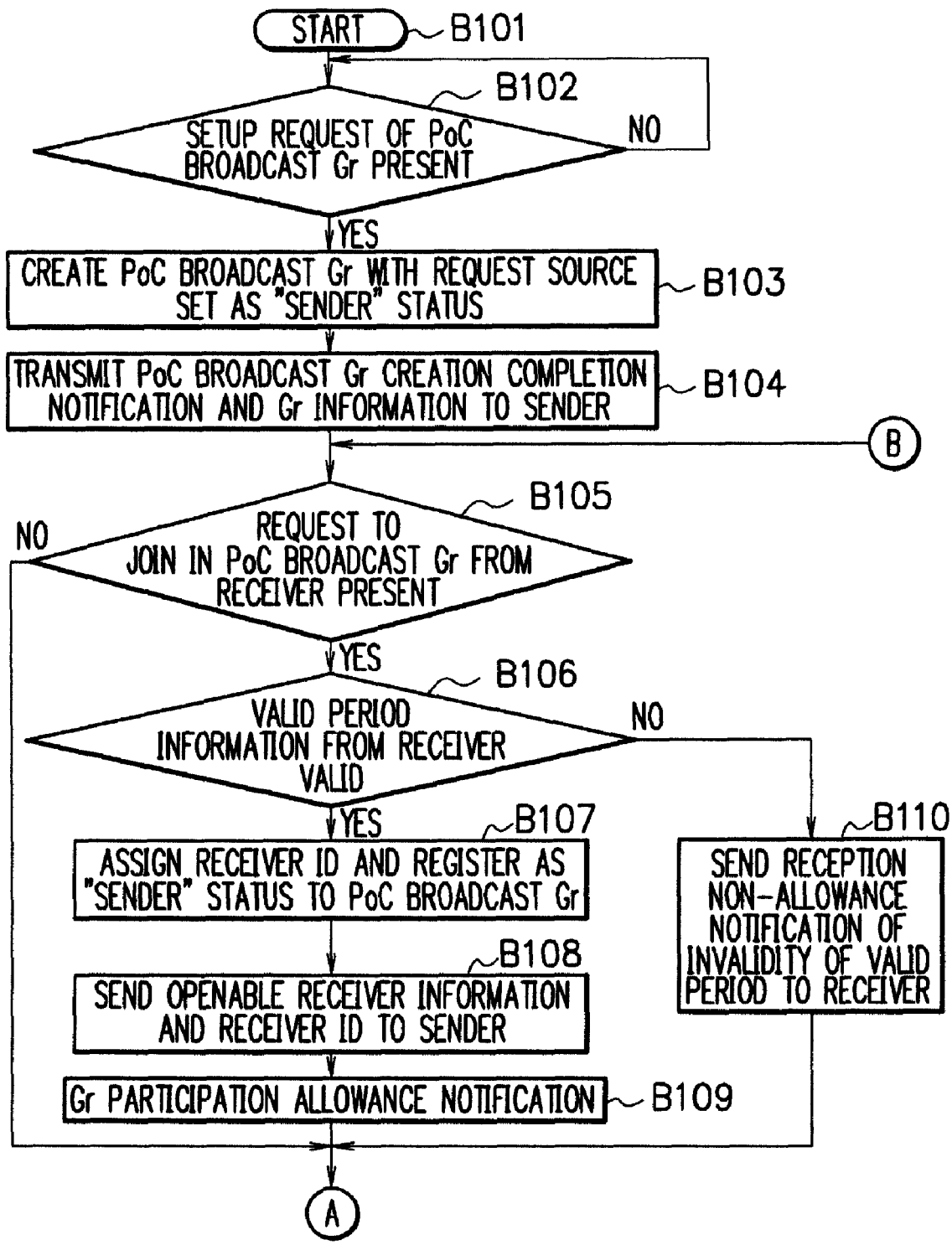
FIG. 4 is a diagram for explaining operation of a PoC server in a broadcast system (PoC broadcast system) in accordance with the first embodiment of the present invention.

Next, description will be given in detail of operation of the embodiment by referring to FIGS. 3 to 5. FIG. 3 is a diagram showing operation of an information terminal 10 functioning as an information issuer (indicated as an issuer in FIGS. 3 to 5) in a PoC broadcast group (PoC broadcast Gr). FIG. 4 is a diagram showing operation of the PoC server 30. FIG. 5 is a diagram showing operation of the cellulars MS1 to MSn functioning as information receivers (indicated as receivers in FIGS. 3 to 5) in the PoC broadcast group (PoC broadcast Gr). Reference is made hereinbelow to FIG. 3 for the operation of the information terminal 10, FIG. 4 for the operation of the PoC server 30, and FIG. 5 for the operation of the cellulars MS1 to MSn.

To achieve the PoC broadcast, in a state before the setup of the PoC broadcast (step A101; Start), an issuer desiring to issue information in the PoC broadcast connects from the terminal 10 to the PoC server (step A102) and requests the PoC server 30 to set up a new PoC broadcast group in which the issuer has an "issuer" status (terminal of first kind) capable of allocating the floor (step A103).

The PoC server 30 receives the setup request (yes in step B102) and then creates a PoC broadcast group in which the terminal of the setup request source has the issuer status (terminal of first kind; step B103). Next, the PoC server 30 sends to the information terminal 10 (issuer) a creation completion notification including information such as a PoC address and a broadcast name of the created PoC broadcast group (step B104).

On receiving the creation completion notification (yes in step A104), the information terminal 10 makes the address (PoC address) of the PoC broadcast open to the public (step A105). Also in the operation, the terminal 10 sets a valid period in which the PoC broadcast is receivable and adds an item obtained by encrypting the valid period information to the PoC address.

For the opening method, a mode thereof is selected on the basis of the receiver as the target; for example, if users of many and unspecified persons are the target, the operation is conducted in a form of a Uniform Resource Locator (URL) on a predetermined web site. Moreover, if users of the cellulars MS1 to MSn including the camera 20 are the target, a print item on which a bar code or the like obtained by converting the URL is printed is distributed thereto so that the users read the bar code by the camera, to thereby make the address public. In addition, if the system is installed as a substitute for a broadcast in a building such as an institute, a contactless IC system which can transmit the PoC address such as Felica (registered trademark) used as a part of the gate apparatus is installed at an entrance of the institute; by configuring the system such that when each of the cellulars MS1 to MSn including the contactless IC 19 passes through the entry, the PoC address is automatically fed to the side of the cellular (MS1 to MSn), and the PoC address is opened to the public.

On the other hand, after receiving the opened PoC address (step C102), the cellular (MS1 to MSn) accesses the PoC address and then transmits a joining or participation request (connection request) to join in the PoC group (step C103) and sends, to the PoC server, information which can be made open to the other terminals (step C104).

In this situation, releasable information which can be made open to other terminals is information useful for other users desiring to join in the PoC broadcast group to obtain a property of a speaker such as his or her handle name, gender, age, and the like, and the information does not include information which identifies the cellular (MS1 to MSn). Naturally, the step C104 may be omitted in consideration of anonymity of the user and easiness of participation in the PoC broadcast group.

The PoC server 30 determines, on receiving the request to join in the PoC group (yes in step B105), whether or not the valid period information contained in the participation request is valid (step B106). In this situation, if the valid period information contained in the participation request is not valid, the PoC server 30 sends a reception non-allowance notification to the cellular having issued the participation request (step B110).

In this fashion, at request of the participation in the PoC group, the valid period set by the information terminal 10 is confirmed on the side of the PoC server 30, and hence it is possible to limit the reception of the PoC broadcast to a fixed period. Also, for example, if the system is installed as a substitute for a broadcast in a building such as an institute, the period of time in which the PoC broadcast is receivable can be limited like the valid period of the conventional admission ticket.

On the other hand, if the valid period information is valid in step B106, the PoC server 30 assigns a receiver ID number to the cellular as the participation request source to join in the PoC group and registers the terminal as a member of the PoC broadcast group, the terminal having a receiver status (terminal of second kind; step B107).

Subsequently, the PoC server 30 inhibits information having high secrecy such as the address of the member with the receiver status (terminal of second kind) from being browsed by the information terminal 10 and the cellulars, and sends the releasable information inputted in step C104 and the receiver ID number to the information terminal 10 (step B108). Moreover, the PoC server 30 transmits a group participation allowance notification (Gr participation allowance notification) of the PoC broadcast including the assigned receiver ID number to the cellular having issued the participation request (step B109).

When the group participation allowance notification (Gr participation allowance notification) is received (yes in step C105), the cellular displays on the display 16 the PoC broadcast name, the receiver ID number, the valid period, the public information of the own terminal, and presence or absence of the floor (step C106). These information items are updated at an appropriate point of time according to the contents of the change information delivered from the PoC server 30.

On the other hand, the Information terminal 10 receives the releasable information and the receiver ID number and then notifies that the participant has been registered to the PoC broadcast group (step A106); in this state, two or more terminals have participated in the PoC broadcast group. Thereafter, the information terminal 10 transfers, to the PoC server 30, the designation of the floor to the own terminal (information terminal 10) and transmits a statement to the PoC server 30 (step A107).

On receiving the designation of the floor to the information terminal 10 (setting the floor to the sender in step B111), the PoC server 30 sets the floor to the information terminal 10 (step B112) and sends the statement from the gainer of the floor (information terminal 10) to all of the members joining in the PoC broadcast group (steps B114 and B115).

The cellular participating therein outputs, if the cellular has not the floor, sound and voice of the statement received from the PoC server 30 from the speaker 18 (steps C107 and C110).

The information terminal 10 displays the ID number, releasable information, PoC key depression information, the number of members joining in the group for each of the cellulars participating in the group, which can be monitored (step A108). If the PoC broadcast is not terminated (no in step A109), step A107 (statement) and the step A108 (member status monitoring) described above are repeatedly executed unless the floor is assigned to another terminal (setting of the floor to a sender in step A110).

As above, in the PoC broadcast according to the embodiment, the floor exists primarily in the information sender (information terminal 10) and the statement from the information sender (information terminal 10) is sent to the all PoC group members. However, the information sender (information terminal 10) also can designate an arbitrary information receiver (cellular joining in the group) to thereby assign the floor to the receiver.

For example, if an operation is carried out by the information sender to assign the floor to the receiver side (setting of the floor to the receiver in step A110), the information terminal 10 notifies the PoC server 30 of the receiver ID number to which the floor is to be assigned (step A111).

The PoC server 30 to which the receiver ID number has been notified sets the floor to the designated receiver ID number (steps B111 and B113).

The cellular assigned the floor in the step B113 is set to a state in which a statement can be made if the user depresses the PoC key assigned to PoC in the console 15 (yes in step C108); the cellular transmits sound and voice received by the microphone 17 to the PoC server 30 (step C109). Naturally, unless the PoC key is depressed, the statement is not broadcast (no in step C108).

Next, the PoC server 30 broadcasts the statement of the gainer of the floor (cellular) to all members of the PoC broadcast group (steps B114 and B115); the information terminal 10 also outputs sound and voice (steps A112 and A113).

PoC key depression information in the cellular thereafter is sent to the PoC server 30 in any situation (step C111); in the information terminal 10, by monitoring the PoC key depression information in the cellular assigned the floor and by confirming the status of the cellular user (step A108), it is possible to obtain timing at which the floor is to be returned to the own terminal.

Moreover, the PoC server 30 is managing the valid period of each cellular joining in the group; if the PoC broadcast termination notification is received (yes in step B116) or if a receiver whose validity period is invalid is present (yes in step B117), the PoC server 30 deletes the cellular from the PoC broadcast group and delivers a termination notification to the cellular (step B118). Also, the PoC server 30 notifies the receiver status reflecting the deletion processing to delete the terminal from the PoC broadcast group to the information terminal 10 (step B119).

On receiving the termination notification (step C113), the cellular displays the reason for the termination (PoC broadcast termination, valid period expiration, etc.) and terminates the reception of the PoC broadcast (steps C114 and C115).

Furthermore, there are two termination triggers including the user operation and the validity period expiration in the description; however, if the cellular includes the contactless IC 19, a gate apparatus may be arranged at an exit of the broadcast area so that the PoC broadcast reception is automatically terminated by the passage of the contactless IC system through the exit gate.

In addition, if the PoC broadcast termination is notified from the information terminal 10 to the PoC server 30 (yes in step A109) and the PoC server 30 receives the termination notification (step B120), the PoC server 30 transmits the termination notification to all cellulars participating in the group (step B121) and terminates the PoC broadcast (steps A114 and B122).

As above, the members of the PoC group are classified into senders and receivers and the right to assign the floor is given to the information sender (terminal of first kind) to thereby make it possible to control the floor, leading to construction of a PoC system equivalent to a broadcast system in which the information sender (terminal of first kind) primarily makes a statement and the information receivers (terminals of second kind) primarily receive the statement. Furthermore, depending on situations, the information sender (terminal of first kind) assigns the floor to a particular information receiver (terminal of second kind), and hence it is possible to appropriately obtain information from the information receiver (terminal of second kind).

Therefore, the present invention is suitably applicable to a broadcast of the type in which the chairperson passes the microphone to reporters in turn; additionally, the present invention is suitably applicable also to a conference of the type in which the chairperson sequentially requires the attendants to make a statement and to a business system or the like in which the manager sequentially requires the members to report the situations.

Moreover, as described above, that the information of the cellulars joining in the PoC broadcast group is basically kept secret is also a property suitable for the broadcast like the radio broadcast in which it is assumed that many and unspecified members participate therein (receive). In addition, the provision of information useful for the operation of the PoC broadcast is achieved by opening only releasable information from members arbitrarily.

Furthermore, if it is assumed that the present invention is applied to a use in a wider area, a plurality of PoC broadcast areas can be arranged and a gate apparatus is disposed between the respective PoC broadcast areas, the gate apparatus transmitting a PoC address to the contactless IC. In this situation, if the member passes through a point near the gate apparatus, the PoC broadcast address is automatically changed, and hence it is possible to receive a PoC broadcast of the area suitable for the location of the user regardless of whether or not the user pay attention to the automatic change.

There is also obtained a configuration wherein at acquisition of a PoC address, the PoC address is automatically registered to a memory in the cellular so that the address is read therefrom as a bookmark; therefore, within the valid period of the PoC address, it is possible to easily access the PoC server to receive the PoC broadcast.

Although description has been given of suitable embodiments of the present invention, by replacing the floor and the statement with a transmission right and data (multimedia data), the system may be modified into a communication system to communicate data other than the sound and voice under supervision of a predetermined person.

Moreover, although description has been given of embodiments using an example in which only the information terminal 10 is the information sender (terminal of first kind), other information terminals connected to the IP network may join in the group as terminals of first kind or the authority as the information sender (terminal of first kind) may be assigned to a predetermined cellular.

Moreover, although description has been given of embodiments using an example of the PoC broadcast system in which only a cellular is a receiver terminal, the present invention is applicable to other communication systems where a half-duplex service is provided by use of the PTT technique under a condition that the members joining in the group are classified into two types for management thereof and the authority to assign the transmission right data is assigned to either one of the two types.

The invention claimed is:

1. A Push-to-Talk server (PTT server) for providing a half-duplex data transfer service wherein transmission data from a terminal which is connected to a packet communication network and which is assigned with a transmission right is broadcast at a time via the packet communication network to terminals of a group to which the terminal belongs, comprising:
   a unit which classifies the terminal joining in a group as a terminal of first kind having authority to assign the transmission right to another terminal belonging to the group and terminals of second kind not having authority to assign the transmission right to the other terminal belonging to the group and thereby managing the respective terminals joining in the group; and
   the PTT server which assigns the transmission right to another terminal belonging to the group according to designation from the terminal of first kind.

2. The PTT server in accordance with claim 1, wherein only a terminal having issued an open request of the group is regarded as the terminal of first kind and authority to assign the transmission right to the other terminal belonging to the group is assigned to the terminal.

3. The PTT server in accordance with claim 1, wherein only releasable information sent from the terminals of second kind is notified to the other terminals.

4. The PTT server in accordance with claim 1, further comprising a unit which determines whether or not each of the terminals is allowed to join in the group on the basis of a valid period given to the terminal.

5. A gate apparatus comprising:
   a unit which automatically transmits an address set to each group inherent to each area to a terminal comprising a contactless integrated circuit (IC), wherein by making the terminal to issue a request to join in a group corresponding to the area to a Push-to-Talk (PTT) server, wherein the PTT server provides a half-duplex data transfer service wherein transmission data from the terminal which is connected to a packet communication network and which is assigned with a transmission right is broadcast at a time via the packet communication network to terminals of a group to which the terminal belongs, and the PTT server comprises a unit which classifies a terminal joining in a group as a terminal of first kind having authority to assign the transmission right to another terminal belonging to the group and terminals of second kind not having authority to assign the transmission right to the other terminal belonging to the group and thereby managing the respective terminals joining in the group, and the PTT server assigns the transmission right to another terminal belonging to the group according to designation from the terminal of first kind.

6. A communication system comprising a Push-to-Talk server (PTT server) connected to a packet communication network and a group of terminals connectable to the PTT server for providing a half-duplex data transfer service wherein transmission data from a terminal to which a transmission right is assigned by the PTT server is broadcast at a time via the packet communication network to terminals of a group to which the terminal belongs, wherein
the PTT server comprises:
a unit which classifies the terminal joining in an arbitrary group as a terminal of first kind having authority to assign the transmission right to another terminal belonging to the group and terminals of second kind not having authority to assign the transmission right to the other terminal belonging to the group and thereby managing the respective terminals joining in the group; and
a unit which assigns the transmission right to another terminal belonging to the group according to designation from the terminal of first kind.

7. The communication system in accordance with claim 6, wherein only a terminal having issued an open request of the group is designated as the terminal of first kind.

8. The communication system in accordance with claim 6, wherein the PTT server notifies only releasable information sent from the terminals of second kind to the other terminals and the terminal of first kind makes a list of the releasable information open.

9. The communication system in accordance with claim 6, wherein
an address set to each group is made to be open with valid period information added thereto; and
the PTT server comprises a unit which determines whether or not each of the terminals is allowed to join in the group on the basis of valid period information transmitted from the terminal.

10. The communication system in accordance with claim 6, wherein a gate apparatus comprising a unit which automatically transmits an address set to each group inherent to each area to a terminal comprising a contactless integrated circuit (IC) is further disposed for each predetermined area, the gate apparatus making the terminal issue a request to join in a group corresponding to the area to the PTT server.

11. A non-transitory computer-readable medium storing a program to be executed by a computer constituting a Push-to-Talk server (PTT server) for providing a half-duplex data transfer service wherein transmission data from a terminal which is connected to a packet communication network and which is assigned with a transmission right is broadcast at a time via the packet communication network to terminals of a group to which the terminal belongs, the program causing the PTT server to perform:
processing for classifying the terminal joining in a group as a terminal of first kind having authority to assign the transmission right to another terminal belonging to the group and terminals of second kind not having authority to assign the transmission right to the other terminal belonging to the group and thereby registering and managing the respective terminals joining in the group; and
processing for assigning the transmission right to another terminal belonging to the group according to designation from the terminal of first kind.

12. The computer-readable medium in accordance with claim 11, wherein only a terminal having issued an open request of the group is registered as the terminal of first kind and terminals joining in the group are registered as terminals of second kind.

13. The computer-readable medium in accordance with claim 11, further causing the PTT server to perform
processing for notifying releasable information sent from the terminals of second kind to the other terminals.

14. The computer-readable medium in accordance with claim 11, further causing the PTT server to perform
processing for determining whether or not each of the terminals is allowed to join in the group on the basis of a valid period given to the terminal.

15. A communication method to be implemented by use of a communication system comprising a Push-to-Talk server (PTT server) connected to a packet communication network and a group of terminals connectable to the PTT server for providing a half-duplex data transfer service wherein transmission data from a terminal to which a transmission right is assigned by the PTT server is broadcast at a time via the packet communication network to terminals of a group to which the terminal belongs, the method comprising:
classifying, by the PTT server, the terminal joining in a group as a terminal of first kind having authority to assign the transmission right to another terminal belonging to the group and terminals of second kind not having authority to assign the transmission right to the other terminal belonging to the group and thereby registering and managing the respective terminals joining in the group; and
assigning, by the PTT server, the transmission right to another terminal belonging to the group according to designation from the terminal of first kind.

16. The communication method in accordance with claim 15, wherein only a terminal having issued an open request of the group is registered as the terminal of first kind and terminals joining in the group are registered as terminals of second kind.

17. The communication method in accordance with claim 15, further comprising:
notifying, by the PTT server, releasable information sent from the terminals of second kind to the other terminals; and
making by the terminal of first kind a list of the releasable information open.

18. The communication method in accordance with claim 15, wherein
an address set to each group is made open with valid period information added thereto, the method further comprising
determining by the PTT server whether or not each of the terminals is allowed to join in the group on the basis of valid period information transmitted from the terminal.

19. The communication method in accordance with claim 15, comprising:
- acquiring by an arbitrary terminal an address set to each group from a web site; and
- issuing by the terminal a request to join in the group to the PTT server by use of the address.

20. The communication method in accordance with claim 15, comprising:
- acquiring by an arbitrary terminal an address set to each group from a bar code, by use of a bar code disposed in the terminal; and
- issuing by the terminal a request to join in the group to the PTT server by use of the address.

21. The communication method in accordance with claim 15, comprising:
- acquiring by an arbitrary terminal an address set to each group from a gate apparatus disposed in a predetermined area, by use of a contactless integrated circuit (IC) disposed in the terminal; and
- issuing by the terminal a request to join in the group corresponding to the area to the PTT server by use of the address.

* * * * *